United States Patent [19]

Bator

[11] 4,371,917
[45] Feb. 1, 1983

[54] VOLTAGE CONVERSION METHOD

[75] Inventor: Tadeusz Bator, Spanga, Sweden

[73] Assignees: Wladimir Wladimiroff, Solna; Hans Andersson, Sandarne, both of Sweden

[21] Appl. No.: 276,384

[22] PCT Filed: Oct. 15, 1980

[86] PCT No.: PCT/SE80/00251
§ 371 Date: Jun. 16, 1981
§ 102(e) Date: Jun. 16, 1981

[87] PCT Pub. No.: WO81/01224
PCT Pub. Date: Apr. 30, 1981

[30] Foreign Application Priority Data
Oct. 16, 1979 [SE] Sweden ............... 7908554

[51] Int. Cl.³ .................. H02M 3/22; H02P 13/18
[52] U.S. Cl. ........................ 363/21; 363/97; 363/124
[58] Field of Search ................... 363/18–21, 363/26, 39–41, 55–56, 79–80, 97, 124, 131; 323/235, 244, 289, 319, 323

[56] References Cited
U.S. PATENT DOCUMENTS 3,618,130 11/1971 Garuts ..................... 363/21 X
4,061,957 12/1977 Jan Vader ................ 363/22
4,063,306 12/1977 Perkins et al. ............ 363/56 X Primary Examiner—William M. Shoop
Assistant Examiner—Peter S. Wong
Attorney, Agent, or Firm—Pollock, Vande Sande & Priddy

[57] ABSTRACT

The invention relates to a voltage conversion method specially feasible for the transformation of low voltages to high voltages by means of a switching convertor. The method according to the present invention eliminates the current transients (B) through the switching unit (S), which is controlled in such a way that the time period ($t_F$) during which the switching unit (S) is in its off-state is made to have a duration such that the resonance voltage ($D_u$) on the transformer windings always has a predetermined phase, when said switching unit (S) is triggered to change to its conduction state. Voltage conversion according to the invention has high efficiency and causes little radio-frequency interference.

7 Claims, 6 Drawing Figures

VOLTAGE CONVERSION METHOD

The present invention relates to a voltage conversion method to drive a switching voltage convertor yielding a high efficiency.

In the majority of DC-DC convertors, the voltage transformation is achieved by chopping a DC voltage, coming from a battery or a rectifier, by means of one or more switching transistors. The chopped DC voltage is then fed to the primary winding of a transformer which transforms the AC-component of said chopped DC voltage up or down, in such a way that one or more AC voltages with predetermined amplitudes are obtained at the secondary windings of the transformer. The AC voltages are then rectified and smoothed and then fed to the output connections of the DC-DC convertor.

The advantage of switched voltage conversion lies in the fact that, if a comparatively high switching frequency is applied, a much smaller transformer can be used than in the case when a 50 Hz AC voltage is transformed and rectified. Switched power convertors can therefore be made small and can have low weight.

In more advanced types of switched DC-DC convertors, the voltage on the secondary winding is sensed and the resulting feed-back signal regulates the pulse width of the switched DC-voltage being fed to the primary winding of the transformer.

In this way an output voltage is obtained which can be kept relatively constant even with a varying load. The feed-back signal can also be used to protect the convertor against short-circuiting and overloading. An example of such DC-DC convertors is the so called "fly-back" convertor.

In switched high voltage power supplies used to deliver high current, two basic convertors are applied. In one type the transformer has a ratio such that the secondary winding directly yields the desired high voltage after rectification. In another type the secondary winding yields only a fraction of the desired high voltage and the final high voltage generation is achieved through voltage multiplication.

The first mentioned type has the advantage of being uncomplicated and small in size. Its disadvantage lies first of all in the fact that a large secondary winding necessarily has a large inductance and large winding capacitance, so that the resonance frequency of the transformer is low. This means that at the moment when the DC voltage is switched, large current and voltage transients will occur at the switching transistors, which have to be dimensioned accordingly to withstand the power loss. The physical explanation why such current and voltage transients must occur is given below.

The transients are a serious problem and to a large extend have limited the applicability of the direct conversion method. Various ways of suppressing such transients have been tried. One of these methods is suggested in the U.S. Pat. No. 4,063,306 of December 1977. Here an actively switched damping circuit is described which limits the amplitude of the transients by activating a filter at the moment such transients occur.

Another method to decrease the power loss is based on a means of regulating the saturation of a transformer core, in order to limit the amplitude of the transients. This method is described in U.S. Pat. No. 4,061,957.

In both methods one has not tried to eliminate the transients, but only describe ways to eliminate, respectively decrease their effect.

The second type of convertor has a considerably high resonance frequency due to a smaller secondary winding. Transients occurring as a result of switching a DC voltage can damp sufficiently before the next switching event takes place. A disadvantage of this type of convertor is the need of a voltage multiplicator, which must contain several diodes and capacitors. This leads not only to a cost increase, but also to larger size and shorter MTBF (mean time between failure) as a result of the increased risk for component failure in the diodes and capacitors. Furthermore such convertors are generally more load sensitive than the first mentioned type.

SUMMARY OF THE INVENTION

The present invention solves the problems. The method is based on voltage conversion by means of a switching unit controlled by a pulse width modulation unit, the switching unit chopping the DC voltage into pulses, which are then fed to the primary winding of a transformer having a secondary winding which yields the predetermined voltage, the voltage being sensed by the pulse width modulation unit.

According to the present invention, the time period when the switching unit is in the off-state is made to have a duration such that the self-oscillating voltage over the primary and secondary circuits always has a predetermined phase at the moment when the switching unit is triggered to switch to the conduction state. In this way, the above mentioned transients are entirely eliminated.

It is advantageous if a control unit senses the self-oscillating voltage on the primary or the secondary winding of the transformer and sends a trigger signal after a predetermined number of half-cycles, and—if required part of a half-cycle, to the pulse width modulating unit controlling the switching transistors. This sensing can be on a separate secondary winding.

The control unit can be a zero detector with a counter, combined with an adjustable timing unit. It is also feasible to sense the current flowing in the secondary winding of the transformer and adjust the timing function of the control unit relative to the actual load. In general only a minor adjustment of the duration of the time period is required for different loads. This is because the frequency of the self-oscillation changes comparatively little with changing Q-value and therefore with the power output.

In such cases where the load on the convertor is comparatively constant, the control unit can consist of a timing circuit with a fixed delay period. The control unit is triggered when the switching unit changes to the off-state and, after a fixed delay period, the control unit sends a trigger pulse to the pulse width modulation unit.

The invention is further described with the aid of the following figures.

DESCRIPTION OF THE PREFERRED EMBODIMENT

Figure 1:
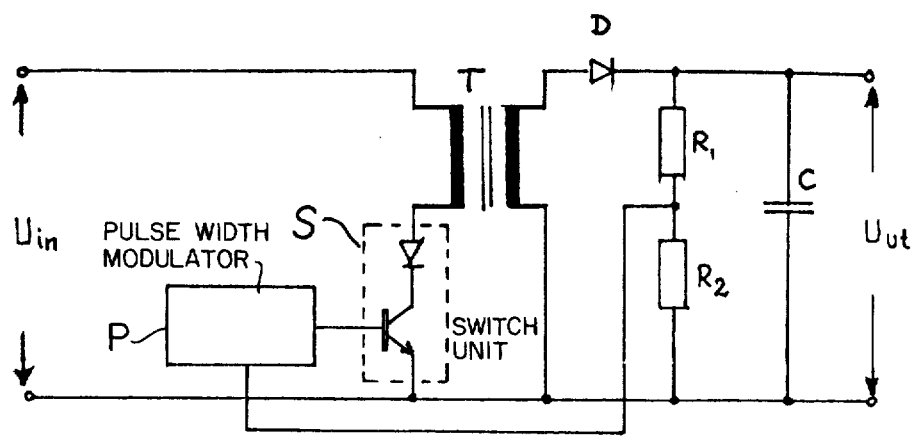
FIG. 1 shows a conventional DC-DC convertor of the so-called "fly-back" type.

In the prior art device of FIG. 1, a pulse width modulation unit P controls a switching unit S which chops a voltage $U_{in}$ so that current pulses will pass through the primary winding of a transformer T. The transformer T transforms the AC-component of the chopped DC-voltage $U_{in}$ up or down so that the required amplitude is obtained on the secondary winding.

This secondary voltage is rectified by one or more diodes D and is smoothed with capacitor C. A voltage divider R1, R2 provides a feedback voltage to the pulse width modulation unit P, which modulates the pulse width so that large pulse widths are obtained at low output voltages, which means large load, and small pulse widths at low load conditions. Switching unit S can contain one or more switching transistors and protective diodes.

Figure 2:
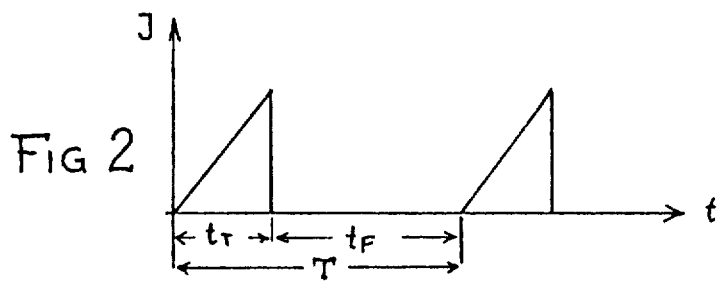
FIG. 2 is a diagram defining the respective pulse time durations.

FIG. 2 shows idealized current pulses through the primary winding. Current flows during the time period $t_T$ when the switching unit is in the conduction state. When the switching unit changes to the off-state, that is during the time period $t_F$, the self-oscillations of FIG. 3 occur. The time period T equals the sum of $t_T$ and $t_F$ and is of the order of 10-1000 microseconds.

Figure 3:
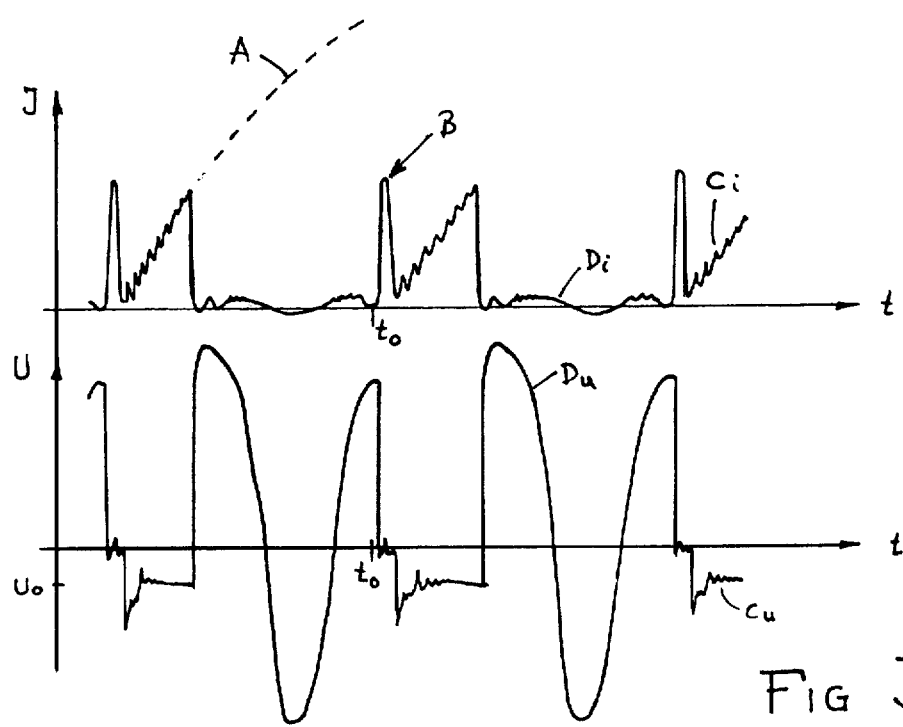
FIG. 3 shows the time dependence of the primary current and primary voltage.

FIG. 3 schematically shows the measured primary current and primary voltage in a prior art device. This convertor, which is to deliver a high voltage, exhibits a typical low frequency (50 kHz) resonance, due to the large inductance and capacitance of the secondary winding. This resonance is marked $D_u$ in FIG. 3. $D_u$ causes a current $D_i$ to flow through the primary winding, as a result of the inherent characteristics of some of the components in switching unit S. When the switching unit turns off the current through the primary winding, the resonance oscillations always start with a half-cycle having the reverse polarity to the driving voltage $U_o$. The switching unit S is triggered at time $t_o$ and when the unit switches the current on, under some circumstances a powerful transient builds up through the switching transistor. This transient is marked B in FIG. 3 and also in FIG. 6, on a larger time scale to illustrate the large power loss in the switching transistors, which in the early stage of the turn-on process have not yet reached saturation and over which there is still a comparatively large rest voltage. After the transient B, the current $C_i$ increases according to curve A, which has a superimposed resonance frequency originating from the primary circuit. This resonance frequency can be of the order of several hundred kHz and is also present on the driving voltage $C_u$.

Figure 4:
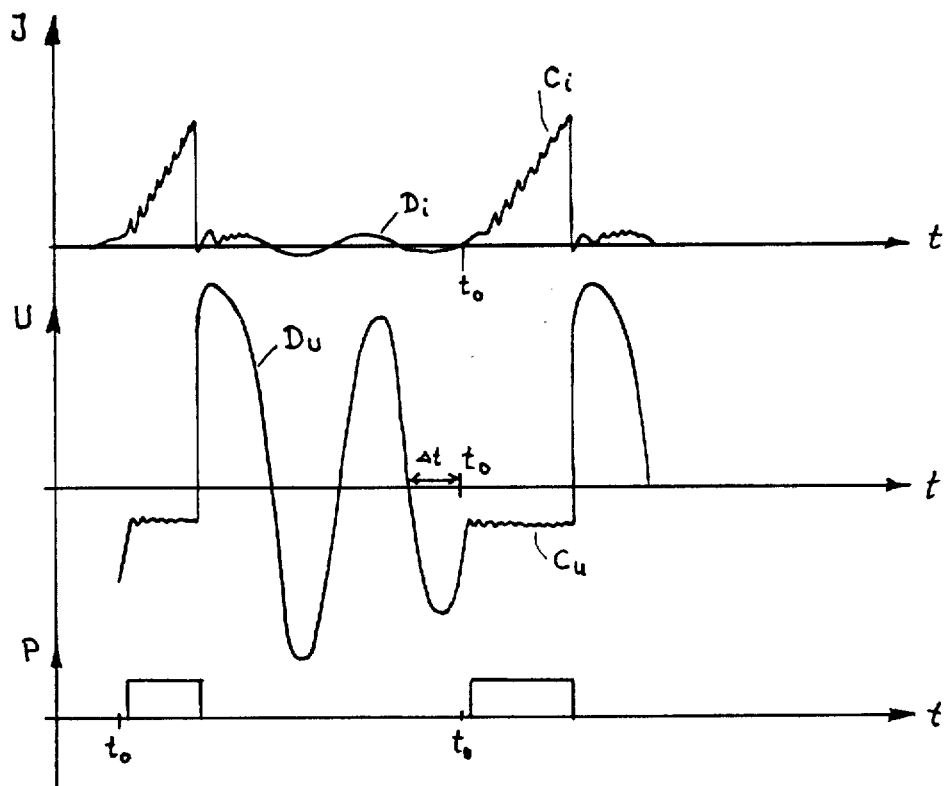
FIG. 4 gives the time dependence of the primary current and primary voltage in an apparatus according to the present invention, with optimum time adjustment of the control unit.

FIG. 4 shows the same diagram as FIG. 3 but for the case where the method according to the present invention is applied to the circuit of FIG. 1. At a certain instant after the switching unit S has switched off, there exists an optimum moment to switch on again, such that the lowest possible power loss in the switching transistors will occur. In the illustrated case, this moment occurs after approximately four half-periods of the oscillating voltage $D_u$. It turns out that, when this timing method is applied, the current transients B are entirely eliminated. Elimination of these transients also has the advantage that the converter according to the invention gives rise to considerably less radio frequency interference.

Figure 5:
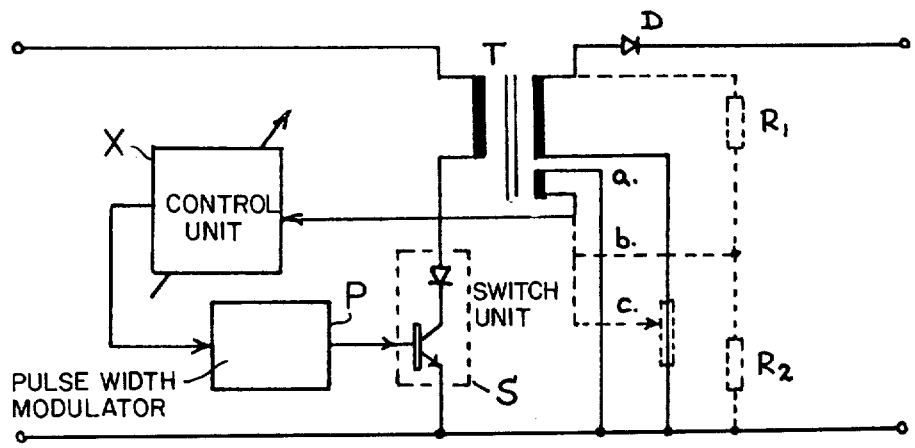
FIG. 5 schematically shows the construction of an apparatus in which the method according to the present invention is applied and in which a feedback signal is obtained in three different ways and FIG. 6 gives a diagram showing the time dependence of the switching transistor current and voltage in a conventional apparatus.

In FIG. 5 it is shown how the method of this invention can be applied in practice. Comparing FIG. 5 and FIG. 1, one notices that a control unit X has been added. The control unit X senses the self-oscillating voltage either on a separate additional secondary winding, marked a, or directly on the secondary power winding via a voltage divider, marked b. The control unit X can for example consist of a zero detecting circuit, which after a predetermined number of zero-crossings plus a variable time period $\Delta t$ gives a trigger pulse (c.f. FIG. 4). Alternatively, in a simpler version of the control unit, the secondary current is sensed and a mean time period $t_F$ is adjusted accordingly. In this case the control unit consists of a current regulated timer circuit. The current sensing method is marked c in FIG. 5. In the case when the load on the convertor is constant a timer suffices as the control unit X. The time period $t_F$ is then adjusted according to the constant load.

Figure 6:
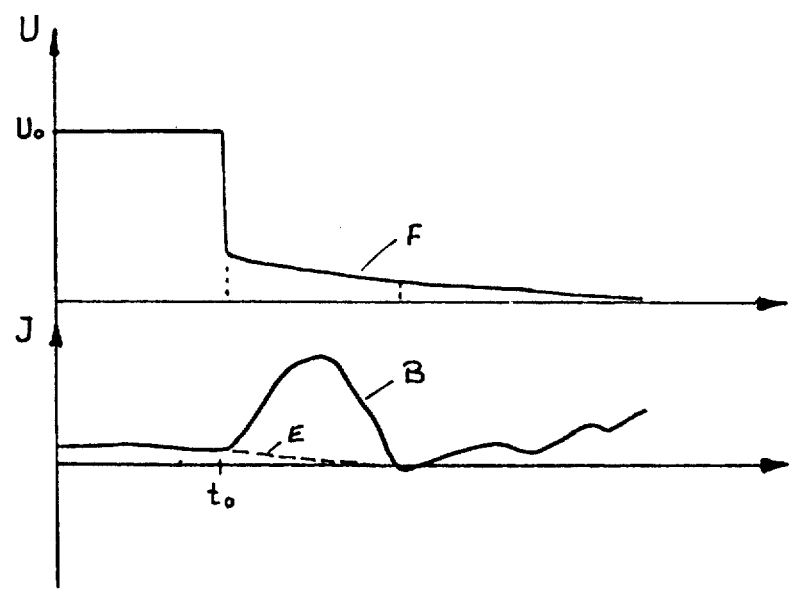

FIG. 6 shows the current transient B on a larger time scale, together with the voltage over the switching transistor. The power loss equals the integral over the product of the functions F and B. The method according to the present invention leads to function E instead of B, which means considerably less power loss.

The foregoing description is exemplary only of the invention described more particularly in the claims which follow.

What is claimed is:

1. A method of converting a d.c. voltage of a first level to another voltage level comprising:
   chopping said d.c. voltage level to form a plurality of input voltage pulses with a pulse unit;
   applying said plurality of voltage pulses to a primary winding of a transformer, said transformer having a secondary winding for delivering pulses for forming a shifted voltage level;
   sensing a cyclical resonance voltage of said transformer windings; and
   controlling the off time of said plurality of input voltage pulses to produce a resonance voltage of said transformer windings having a predetermined phase relationship with respect to said plurality of input voltage pulses corresponding to a minimum power loss.

2. The method of claim 1, wherein said plurality of input voltage pulses have a beginning point controlled to occur at intervals corresponding to a predetermined number of half cycles of sensed resonance voltage.

3. The methods of claim 1, wherein said plurality of pulses applied to said primary winding have an offtime corresponding to a predetermined number of half cycles of said sensed resonance voltage.

4. The method of claim 1, wherein said resonance voltage for said transformer is sensed at said secondary winding.

5. The method of claim 1, wherein said plurality of pulses are controlled by detecting the zero crossing of said sensed resonance voltage, and initiating each of said plurality of pulses a predetermined elapsed time subsequent to said zero crossings.

6. The method of claim 1 or 2, including:

sensing load current in said secondary winding; and altering the timing of said plurality of input voltage pulses in response to load current changes whereby the phase between said resonant voltage and said plurality of voltage pulses remains the same.

7. The method of claim 2, wherein said predetermined number of half cycles is at least 4.

* * * * *